March 21, 1961

K. EICKMANN 2,975,716

ROTARY ENGINE, IN PARTICULAR FLUID TRANSMISSION

Filed Feb. 3, 1954

INVENTOR:
KARL EICKMANN
BY:

INVENTOR:
KARL EICKMANN
BY:

March 21, 1961  K. EICKMANN  2,975,716
ROTARY ENGINE, IN PARTICULAR FLUID TRANSMISSION
Filed Feb. 3, 1954  5 Sheets-Sheet 3

INVENTOR:
KARL EICKMANN
BY:

March 21, 1961     K. EICKMANN     2,975,716
ROTARY ENGINE, IN PARTICULAR FLUID TRANSMISSION
Filed Feb. 3, 1954     5 Sheets-Sheet 4

INVENTOR:
KARL EICKMANN
BY:

INVENTOR:
KARL EICKMANN
BY:

ary engine, in particular fluid transmission with at least one rotary pump, or
United States Patent Office 2,975,716
Patented Mar. 21, 1961

2,975,716
ROTARY ENGINE, IN PARTICULAR FLUID TRANSMISSION

Karl Eickmann, 2420 Isshiki, Hayama-machi, Miuragun, Kanagawa-ken, Japan

Filed Feb. 3, 1954, Ser. No. 407,983

19 Claims. (Cl. 103—120)

This invention relates to a rotone rotary motor (most suitably, however, with a rotary pump and a rotary motor) and comprising wings or vanes sliding in slots in the center rotor of the engine and on the outside surrounded by a guide ring, or the housing. End walls, connected to the center rotor, are further provided which engage the vanes at the axial ends thereof and which define together with the vanes and the guide ring or the housing, chambers which increase and decrease in volume during rotation of the engine.

An object of the invention is to provide leak-tight guiding of the vanes permitting use of the fluid transmission under high pressures and obviating any tipping tendency of the vanes. Another object of the invention is the provision of a vane guide which is simple in design and easy to build.

A further object of the invention is the reduction of power losses, or undesired counter pressures, resulting from unnecessary compression of the medium confined within the guide ways, and to provide, at the same time, a dependable seal about the guide spaces under elimination of losses by leakage.

A still further object of the invention is to provide for substantially frictionless mounting of the guide ring.

Still further objects of the invention concern measures effecting a tight abutting engagement of the vanes on the guide ring, respectively, on the housing wall forming the bearing surface for the vanes.

An important object of the invention therefore consists therein that each end wall is composed of two disks or end wall members of which the innermost, which is situated closest to the rotor, is provided with radial slots which serve to guide the vanes at the axial ends thereof, whereas the outermost side disk tightly seals the slots toward the outside.

According to another feature of the invention, a construction which is particularly advantageous with respect to manufacture and mode of operation can be obtained by mounting the vanes with play in the slots of the center rotor, and preferably with guides in the grooves. The medium under pressure can thereby pass from a chamber which is under pressure above atmospheric, into the slot and can thus urge the wing into abutting engagement with the opposite wall of the slot as well as with an outer guide ring, respectively, with a corresponding housing wall under obtainment of an especially effective seal.

According to another feature of the invention the radial slots or grooves in the end walls are closed at either end and the chambers thus formed, the volume of which is changed from a maximum to a minimum during each revolution of the engine, are in communication with each other to provide for pressure balance. The chambers at the ends of the several radial slots can be connected with each other by annular ducts, the innermost and outermost of which are preferably in communication with each other by single bores in the end walls.

Other objects and features of the invention will become apparent from the following description taken in connection with the accompanying drawings which illustrate several embodiments of the invention. In the drawings.

Figure 1:
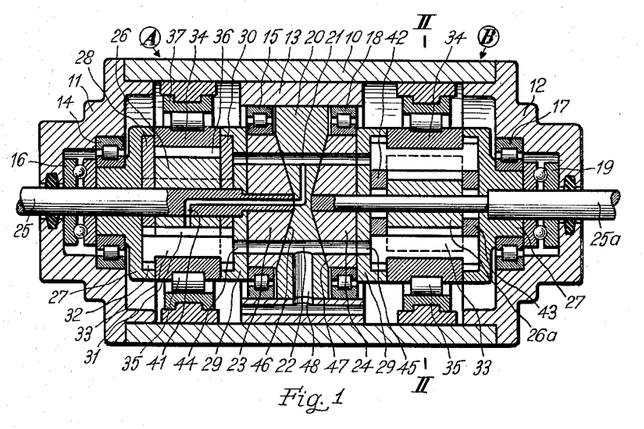
Fig. 1 is a longitudinal sectional view through one embodiment of the transmission.
Figure 2:
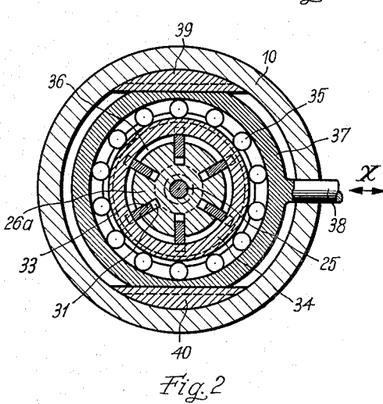
Fig. 2 is a cross-sectional view through the same, taken along line II—II of Fig. 1.

In Figs. 1 and 2 the housing 10 is closed on the outside by end shields 11 and 12. The rotating parts of the transmission pump A are rotatably supported by antifriction bearings 14, 15 and 16 in the center member 13 and end shield 11, and the rotating parts of the transmission motor B by antifriction bearings 17, 18 and 19 in the end shield 12. An intermediate member 20 having fluid ducts 21 and 22 is rigidly mounted between pump and motor and the slide members 23 and 24 are in abutting engagement therewith. Fluid pump and fluid motor are basically similar in construction and need only differ from each other by their proportion in the different embodiments.

The center rotor both when used as fluid pump and fluid motor comprises a shaft 25 respectively 25a, a center cylinder 26 mounted on the shaft, and two end wall means, rigidly connected with the center cylinder, each of which is composed of two disks or end wall members 27, 28, respectively, 29, 30. The center rotor cylinders are provided with radial grooves 31 and the inner end wall members 28 and 30 with slots 32 in which the wings or vanes 33 may slide radially, yet are closely fitted axially in the slots 32, the latter being tightly sealed toward the outside by the outer end wall members 27 and 29.

The center rotor is surrounded by the guide ring 34 which revolves in the anti-friction bearing 35 and is eccentrically adjustable with respect to the center cylinders 26, 26a, so that on rotation only a slight relative movement takes place between the end wall members 28, 30 and 27, 29, on the one hand, and the guide ring 34, mounted with close clearance fit between them, on the other hand. Between the center cylinders 26, 26a and the guide ring 34 are formed cells or chambers 36 which are of variable volume and confined by the end wall members 28, 30. Variation of volume is effected by adjustment of the adjusting ring 37, supporting the anti-friction bearing 35, which may be moved by means of the rod 38 on the guide ways 39, 40 in either direction of the arrow *x*. In the embodiment of the invention according to Fig. 1, the vanes 33 of the transmission pump are forced outwardly by feeding a fluid under pressure above atmospheric pressure through the duct 41 into the slots 31 under the vanes 33 and the vanes are thus urged into abutting engagement with the guide ring 34. Resilient rings 42, 43, as shown in the transmission motor, or the like, may also be provided if occasion requires.

Depending on the degree of eccentric adjustment of the adjusting ring 37 with respect to the center rotor, a greater or lesser suction is exerted on the fluid on increase of the volume of the chambers and a corresponding pressure on decrease of the same. The chambers 36 are connected through the bores 44 and 45 and via the control faces 46, 47 between the disks 23 respectively 24 and the center member 20 of the housing with oil ducts 21, 22 arranged in the latter.

When the shaft 25 of the pump A of the transmission is driven by a separate source of power and hence the rotor rotated, then the volume of the chambers increases during one-half revolution of the rotor and decreases during the next half revolution thereof. The decreasing volume of the chambers forces the fluid through the duct 21 into the chambers of the transmission motor B thereby rotating the rotor of the same in that the separate chambers are filled under pressure so long until the respective chamber has reached the position of its greatest volume during this rotation.

After performing its work the fluid leaves the motor through the duct 22 and returns to the suction side of the pump where the fluid is sucked up anew. The transmission pump is driven with constant speed. The transmitted and converted power is on the driven side taken off on the motor shaft 25*a*. The speed and the direction of rotation of the transmission motor are determined by the degree of eccentricity of the guide ring with respect to the pump shaft 25 and motor shaft 25*a* respectively. The greater the eccentric adjustment of the guide ring 34, the greater will be the variation in volume of the pump chambers and hence the speed of the transmission motor. The speed of the motor will be zero when the guide ring 34 is centrically adjusted with respect to the rotor (Fig. 2), and the direction of rotation of the motor will be reversed when the guide ring 34 is eccentrically displaced beyond the zero position in the other direction.

Figure 3:
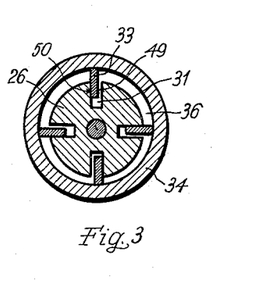
Fig. 3 is a partial view similar to Fig. 2 through another embodiment of the invention.

In the embodiment of the invention according to Fig. 3 the vanes 33 are slidably arranged with play 49 in the slots 31 of the center cylinder 26, so that the fluid or other medium under pressure may pass from the chambers 36 through the gap 49 to the innermost sides of the vanes 33. The vanes are thereby urged by the medium into abutting engagement with the wall 50 opposite to the gap 49 of the center cylinder 26 as well as with the guide ring 34. Experience has proved that by this construction with play a particularly leak-tight sealing effect can be achieved.

Figure 4:
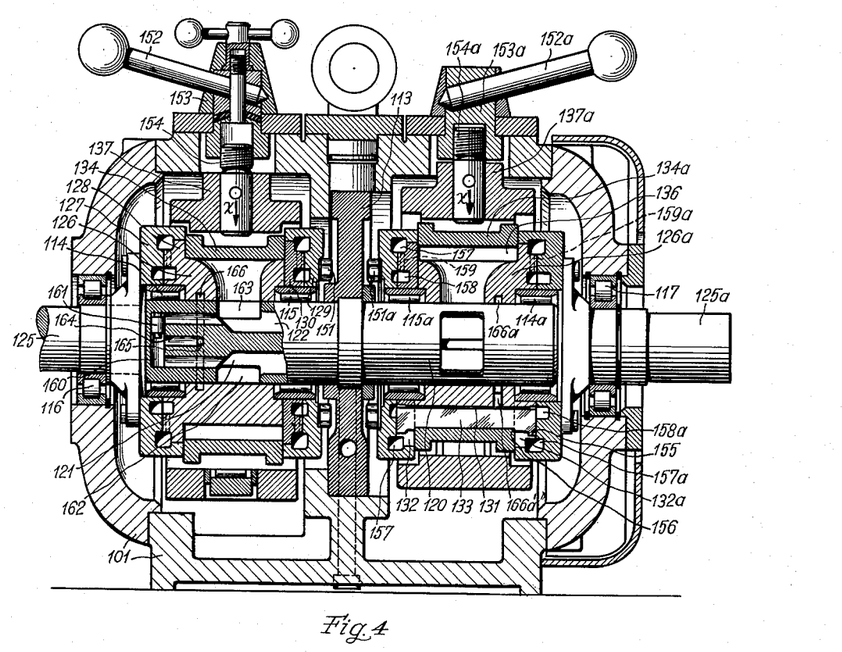
Fig. 4 is an axial sectional view through a further embodiment of the invention.
Figure 5:
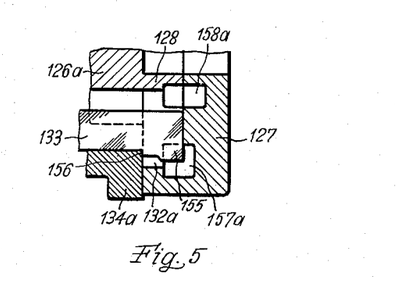
Fig. 5 is an enlarged portion of Fig. 4 showing the lateral guiding of the wings.

In the embodiment of the invention according to Figs. 4 and 5 the center rotor composed of both the end walls 127, 128 and 129, 130 and the center cylinder 126 is fixedly secured to the shaft 125 by means of bolts 151. The center cylinder 126 of the transmission pump, on the one hand, and the center cylinder 126*a* of the transmission motor, on the other hand, are rotatably supported upon the shaft 120 which is fixedly mounted in the center member 113 of the housing 101. The part 128 of the outer end wall is made integrally with the center cylinder 126 respectively 126*a*, whilst the part 130 of the opposite end wall is made as a separate part, yet may, if necessary, likewise be made integrally with the center cylinder, particularly then when the guide ring 134 is made up of two pan-shaped parts. Both wall members may also be made separately from the center cylinder if occasion requires. The rotor with the shaft 125 is, on the one hand, rotatably supported by means of a roller bearing 116 in the housing 101 and, on the other hand, by means of the roller bearings 114, 115 on the fixed shaft 120. The guide ring 134 is supported (in a manner here not shown in detail, e.g. similar to Fig. 6) by the adjusting ring 137, which by means of a lever 152, an adjusting collar 153 fixed thereto and by a screw 154 threadedly engaging the collar 153*a* may be adjusted in axial direction *x* so as to bring the guide ring into a more or less eccentric position with respect to the center cylinder 126.

The transmission motor is constructed in a manner corresponding to that of the hereinbefore described transmission pump. The power-output shaft 125*a* of the suction and the center cylinder 126*a* with the associated end walls are rigidly secured together by means of bolts 151*a* and the power-output shaft 125*a* is rotatably mounted by means of the roller bearings 117 in the housing 101 as well as by means of the roller bearings 114*a* and 115*a* on the fixed shaft 120. The guide ring 134*a* is supported by the adjusting ring 137*a*, which by means of the lever 152*a*, adjusting collar 153*a* and screw 154*a* threadedly engaging the collar 153*a* is likewise adjustable in direction *x*.

The vanes 133 are similar to the vanes of the embodiments of the invention shown in Fig. 2 or 3, and are mounted in the slots 131 of the center cylinder and guided in the wall members 128 and 130. The aforesaid members are for this purpose, as clearly shown in the lower portion of the section through the transmission motor, provided with slots 132, 132*a* in which the lateral ends of the vanes 133 are slidingly disposed for radial movement therein.

The ends of the vanes 133 are likewise, as in the case of Fig. 1, stepped-up to a larger diameter as, e.g. is indicated at 155 in Figs. 4 or 5 so as to form a sealing edge 156. The outer space portions of the slots 132, 132*a* thus separated from the cells 136 are in communication with annular ducts 157 and 157*a* respectively, whereas the innermost ends of the slots are in communication with each other by annular ducts 158 and 158*a* respectively.

In addition, the outer ducts 157 and 157*a* are through bores 159 and 159*a* in communication with the inner ducts 158 and 158*a*, so that an always equal pressure prevails at any given time in the outer and inner annular ducts in the outer and inner spaces of the slots 132, 132*a*.

The supply of the medium under pressure to the separate cells is accomplished through the hollow shaft 120 and depending on the direction of rotation of the shaft 125, through the ducts 121, 122. In addition, pressure fluid is supplied to portions of the slots 131 located radially inwardly of vanes 133. For this purpose a change-over valve 161 is arranged in the cross-bore 160 connecting the ducts 121, 122. The valve 161 may slide in the bore 160 and, depending as to whether the medium is conducted through the duct 121 or 122, it is moved by the medium under pressure into the one or the other end position. Admission of medium under pressure takes place at any given time through one of the two openings 162 respectively 163 (shown staggered by 90° in the drawing) depending on which of the cells is in the pressure stroke. A center bore 164 leads to a transverse duct 165 which is in communication with an annular groove 166 and conducts the medium under pressure into the inner slot portion radially inwardly of the vanes 133. A controlled center bore (corresponding to the center bore 164) is in a corresponding manner provided for the annular groove 166*a*. This annular groove being in communication with the slots 131 through bores 166*a*'.

On movement of the vanes 133 in the slots 132 respectively 132a, depending on the adjustment of the adjusting rings 137 respectively 137a, the fluid contained in the slot ends can be balanced through both the outer annular ducts 157, 157a and the inner annular ducts 158, 158a. The fluid entering through the annular ducts 166 below the vanes 133 acts in addition to the centrifugal force so that the vanes 133 are always held under pressure in abutting engagement with the guide rings 134 and 134a, respectively. Fig. 5 shows the lower right-hand corner of the transmission motor; a lower position being, however, assumed by the guide ring 134a than in Fig. 4.

Figure 6:
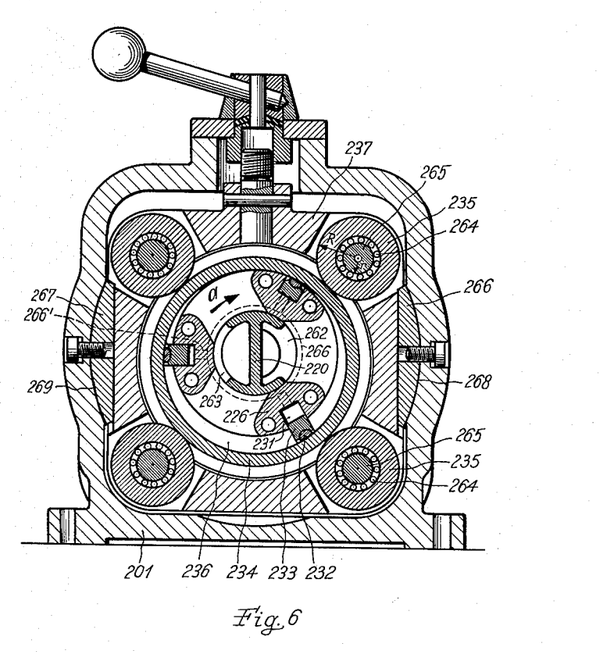
Fig. 6 is a cross-sectional view through a third embodiment of the invention.

The embodiment of the invention according to Fig. 6 differs from that according to Figs. 4 and 5 essentially only in that the vanes 233 are provided with slide members 232 which are cylindrically supported therein and slide upon the guide ring 234 so as to effect maintenance of a reliable seal between the several cells 236 of the transmission pump respectively transmission motor on eccentric rotation of the center rotor 226 with respect to the guide ring 234.

Fig. 6 further shows the support of the guide ring 234 in the adjusting ring 237. The guide ring 234 is supported between four thick-walled rollers 235 which on their part are supported by means of relatively small roller bearings 264 on pins 265 of the adjusting ring. Owing to the high ratio $R/r$ the circumferential velocity of each roller 264 is reduced and in consequence thereof only relatively small roller bearings need be provided. As is evident from Fig. 6, $r$ is less than $\frac{1}{2}$ of $R$. The adjusting ring 237 is mounted between slides 266, 267 which are adjustable by means of spherical faces 268, 269 in the housing 201.

Also in this case the medium under pressure enters and leaves through openings 262, 263, and on rotation of the center rotor in the direction of arrow $a$, sucked-up fluid, if necessary, under initial pressure, enters in the case of the transmission pump through the opening 262, whereas the opening 263 serves for discharging the compressed fluid which has been compressed in the cells. In the case of the transmission motor the compressed fluid which has been compressed by the transmission pump is, on rotation in direction $a$, forced in through the opening 262, and it leaves through the opening 263 after having done its work by delivering its energy to the power-output shaft.

The slots 231 are through bores 266′ in communication with an annular groove 266, the former being controlled in a manner as shown in Fig. 4 (not shown in detail in Fig. 6) by means of change-over valves (similar to 161 in Fig. 4).

Figure 7:
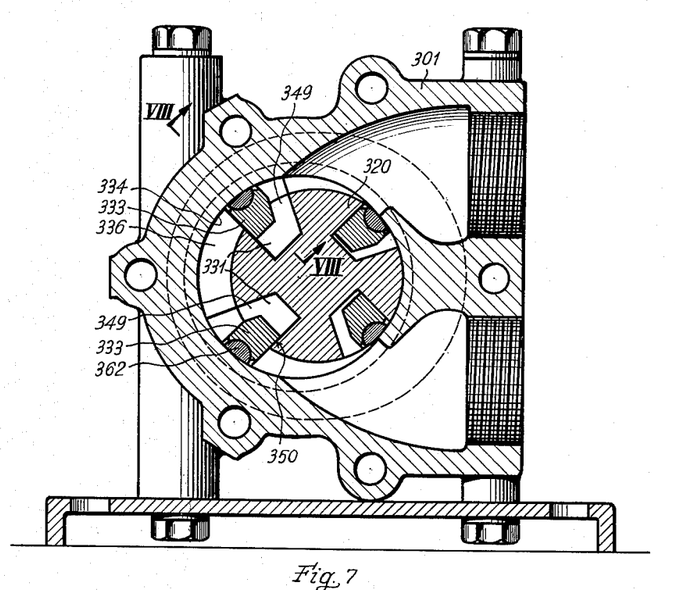
Fig. 7 is a cross-sectional view through a fourth embodiment of the invention taken in the plane of line VII—VII in Fig. 8.
Figure 8:
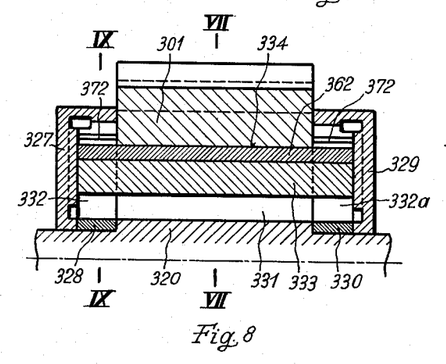
Fig. 8 is a fragmentary longitudinal sectional view taken in the plane of line VIII—VIII in Fig. 7, the wings being in contrast to Fig. 7 assumed as leak-tightly guided in the center rotor.
Figure 9:
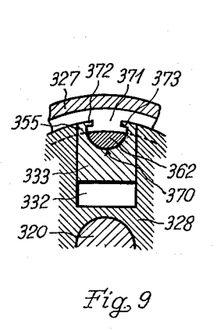
Fig. 9 is a sectional view taken in the plane of line IX—IX in Fig. 7.

In the embodiment of the invention according to Figs. 7–9 the center rotor 320, which together with its driving shaft is formed integrally from a solid bar or block, is provided with radial slots 331 which are especially wide in proportion to the vanes 333 guided therein. The radially innermost spaces of the slots are therefore in open communication with the cells 336 by means of connections 349. Cylindrically supported slides 362 serve also in this case for the purpose of sealing the vanes 333 against the sliding surface 334 on the housing 301. Tipping of the vanes is prevented by their lateral guiding in the lateral slots of the end walls corresponding to the hereinbefore described embodiments. No provision is made in this embodiment of the invention for a separate co-rotating guide ring, so that the vanes 333 and the slides 362 respectively rotate with full speed in the transmission housing which, however, is permissible for lower sliding velocities.

By the pressure prevailing in the cells 336 the vanes are, on the one hand, urged into leak-tight abutting engagement with the wall faces 350 located opposite the clearance 349 and, on the other hand, with the sliding surface 334. With the means above described eminently favorable leak-tight sealing effects are obtained.

Figure 10:
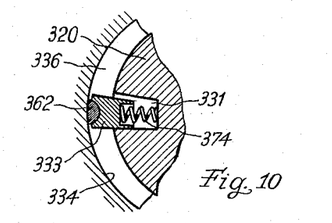
Fig. 10 shows a modification to Fig. 7.

Should it be desired to operate the transmissions or machines with lower speeds, eventually down to zero, springs 374 (Fig. 10) which urge the vanes 333 outwardly into abutting engagement with the sliding surface 334 may then be particularly advantageously employed. These springs are seated, on the one hand, on the radially innermost ends of the slots 331 and, on the other hand, on the innermost edges of the vanes, respectively in recesses provided therein. Provision for such spring supports may, of course, also be made in the other embodiments.

Figs. 8 and 9 show the support of the slides 362 in the vanes 333. For this purpose the vanes are provided with grooves which, as shown at 371, are open on the outside in radial direction. Furthermore, the vane portions 355 which are stepped-up to a larger diameter and guided in the latertal slots or grooves 332 are provided with inwardly directed projections 372, 373 to thereby prevent the slides 362 from falling out, even if it should happen that the vanes are accidentally raised from the sliding surface by shocks, or the like. The end walls which rotate together with the center rotor and are suitably, similarly as in the embodiment according to Figs. 1 and 4, composed of single disks 327, 328, and 329, 330 respectively, the slots 332 and 332a respectively being arranged in the disks 328 and 330.

Similarly as in the embodiment according to Figs. 4 and 5 provision is made in the embodiment according to Figs. 8 and 9 for inner and outer annular ducts in the end walls serving to guide the vanes. In the embodiment according to Fig. 7 these annular ducts are, however, dispensed with.

The adjustment of the eccentricity of the center rotor with respect to the housing is in this case achieved that the center rotor 320 together with its shaft is adjustable transversely with respect to the housing.

Figure 11:
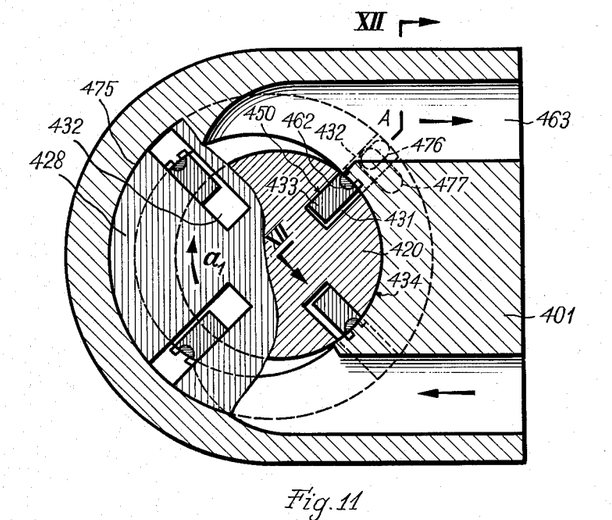
Fig. 11 shows a further modification to Fig. 7 in a sectional view taken on the right in the plane of line XI—XI and on the left in the plane of line XI'—XI' in Fig. 12.
Figure 12:
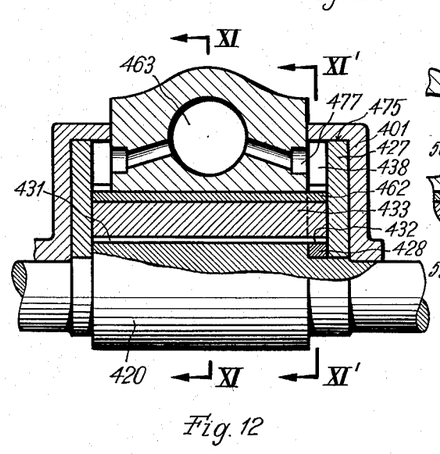
Fig. 12 is a sectional view taken in the plane of line XII—XII in Fig. 11 and Fig. 13 a further modification in a sectional view similar to Fig. 12.

In the embodiment according to Figs. 11 and 12, the vanes 433 slide in slots 431 arranged in the center rotor 420 of the rotary engine revolving in the direction of arrow $a_1$ and slides 462 supported by the vanes 433 abut against the surface 434 of the casing 401. At their axial ends the slides 433 axially project into slots 432 in end wall member 428, said end wall member as well as the end wall member 427 radially project into annular grooves 475 of the casing 401. A channel 476 branches off from the pressure duct 463 and communicates with a groove 477 formed on the axial surface of the casing 401 co-operating with the end wall member 428.

Such channel or groove 477 has the following effect: If the vane 433 reaches the position A, the pressure in the duct 463 tends to lift the vane from the walls 434 on the one hand and from the wall 450 of the rotor on the other hand, owing to the difference of pressure existing on both sides of the vane. This is however prevented by the groove 477 which allows the pressure medium to get from the duct 463 by means of the channel 476 into the slots 432, 431 so long as the slot 431 communicates with the groove 477.

Figure 13:
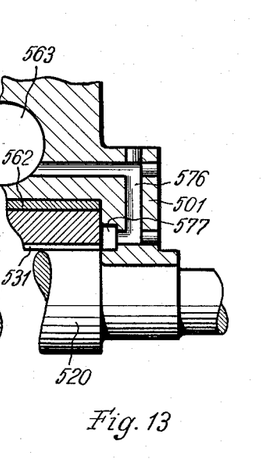

In a more simple modification according to Fig. 13 the annular groove 475 is omitted. In this case, the channel 576 branched off from the pressure duct 563 is radially inwardly extended and communicates with a groove 577 arranged at a relatively small diameter in the casing 501 and being controlled directly by the slot 531 in the rotor 520.

The invention disclosed and claimed in this application is primarily a fluid transmission, but it will be apparent to those skilled in the art that it is equally applicable to pumps, compressors, internal combustion engines, gas engines, compressed-air engines, fluid motors, or the like. It is intended that the patent shall cover, by suitable expression in the appended claims, whatever features of patentable novelty reside in the invention.

What I claim is:

1. In a rotary pump or motor, in combination, a center rotor element formed with slot-shaped apertures extending in substantially radial direction; a plurality of vanes slidably arranged in said apertures respectively and having each opposite axial end portion extending in radial and axial direction beyond said rotor element; a guide ring element surrounding said rotor element and guiding said vanes in radial direction, one of said elements being adjustable with respect to the other for adjusting the distance between the axes of said elements; and end wall means at said axial end portions of said vanes for axially closing chambers formed between said center rotor element, said vanes and said guide ring element, each of said end wall means being composed of an outer end wall member and an inner end wall member located between said rotor element and said outer end wall member and abutting against said outer end wall member with an end face, only said inner end wall member being formed with slots extending through said inner end wall member in radial direction to the periphery of said inner wall member and in axial direction to said end face thereof for respectively receiving and guiding said vane end portions, whereby said slots may be machined together with said slot-shaped apertures in said center rotor element to exactly the same dimensions, said slots being radially and axially outwardly closed by said outer wall member, said rotor element, vanes, and end wall means rotating together and when said axes of said elements are spaced from each other said vanes moving radially along said slots while said chambers increase and decrease in volume during rotation of said rotor to cause a fluid to be pumped in the case of a pump or to cause said rotor to be driven in the case of a motor.

2. The rotary engine of claim 1, wherein at least one of said two inner wall members is made integrally with said center rotor element.

3. The rotary engine of claim 1, wherein said slot-shaped apertures are wider in circumferential direction than the thickness of said vanes so as to permit fluid under pressure contained in said chambers to pass past said vanes into the radially innermost portions of said slot-shaped apertures.

4. The rotary engine of claim 3, furthermore comprising a suction duct, a pressure duct for the medium conveyed by the rotary engine, a passage branched off from the pressure duct and arranged so as to consecutively communicate with each of said radial slots in a circumferential position of the same when the vane located in the respective slot reaches its radially innermost position in the respective slot during rotation of the center rotor.

5. The rotary engine of claim 1, wherein said outer wall members are radially outwardly extended respectively beyond said inner wall members and respectively have at their peripheries annular uninterrupted flanges respectively surrounding and located next to the peripheries of said inner wall members for outwardly closing the slots arranged therein.

6. In a rotary pump or motor, in combination, a center rotor formed with substantially radial slot-shaped apertures, radially slidable vanes in said slot-shaped apertures, a guide ring surrounding said rotor for radially guiding said vanes and being arranged eccentrically with respect to said center rotor, end walls at the axial ends of said vanes for axially closing chambers formed between said center rotor, said vanes and said guide ring, said chambers being alternately enlarged and reduced in volume in each revolution of said center rotor, a member adjacent to said center rotor, said center rotor being movable relative to said member, a duct in said member establishing communication with the chambers which are enlarged in one direction of rotation of said center rotor, a further duct in said member establishing communication with the chambers which are reduced in the same direction of rotation of said center rotor, a third duct in said member establishing on the one hand communication with said slot-shaped apertures in said center rotor at radial innermost spaces thereof and on the other hand with said two aforementioned ducts, and valve means in said ducts movable under the pressure difference prevailing between said two first mentioned ducts such that it will at any given time shut off communication between that one of said two first mentioned ducts in which a lesser pressure prevails and said third duct, and open communication between the other one of said two first mentioned ducts and said third duct.

7. In a rotary pump or motor as recited in claim 6, wherein said member is a fixed shaft member supporting said center rotor.

8. In a rotary pump or motor, in combination, a center rotor element formed with slot-shaped apertures extending in substantially radial direction; a plurality of vanes slidably arranged in said apertures respectively and having each opposite axial end portion extending in radial and axial direction beyond said rotor element; a guide ring element surrounding said rotor element and guiding said vanes in radial direction, one of said elements being adjustable with respect to the other for adjusting the distance between the axes of said elements; end wall means at said axial end portions of said vanes for axially closing chambers formed between said center rotor element, said vanes and said guide ring element, each of said end wall means being composed of an outer end wall member and an inner end wall member located between said rotor element and said outer end wall member and abutting against said outer end wall member with an end face, only said inner end wall member being formed with slots extending through said inner end wall member in radial direction to the periphery of said inner wall member and in axial direction to said end face thereof for respectively receiving and guiding said vane end portions, whereby said slots may be machined together with said slot-shaped apertures in said center rotor element to exactly the same dimensions, said slots being radially and axially outwardly closed by said outer wall member, said rotor element, vanes, and end wall means rotating together and when said axes of said elements are spaced from each other said vanes moving radially along said slots while said chambers increase and decrease in volume during rotation of said rotor to cause a fluid to be pumped in the case of a pump or to cause said rotor to be driven in the case of a motor, said slots in said inner wall members having spaces at both radial ends thereof alternately enlarged and reduced in volume by the radial to and fro motion of said vanes; and duct means for connecting the radially innermost spaces of said slots with the radially outermost spaces thereof, so that any fluid located in said spaces can freely move from the spaces decreasing in volume during the to and fro motion of said vanes to the spaces increasing in volume substantially without friction, whereby forces tending to disengage said vanes from said guide ring element are avoided.

9. In a rotary pump or motor, in combination, a center rotor element formed with slot-shaped apertures extending in substantially radial direction; a plurality of vanes slidably arranged in said apertures respectively and having each opposite axial end portion extending in radial and axial direction beyond said rotor element; a guide ring element surrounding said rotor element and guiding said vanes in radial direction, one of said elements being adjustable with respect to the other for adjusting the distance between the axis of said elements; end wall means at said axial end portions of said vanes for axially closing chambers formed between said center rotor element, said vanes and said guide ring element, each of said end wall means being composed of an outer end wall member and an inner end wall member located between said rotor element and said outer end wall member and abutting against said outer end wall member with an end face, only said inner end wall member being formed with slots extending through said inner end wall member in radial direction to the periphery of said inner wall member and in axial direction to said end face thereof for respectively receiving and guiding said vane end portions, whereby said slots may be machined together with said slot-shaped apertures in said center rotor element to exactly the same dimensions, said slots being radially and axially outwardly closed by said outer wall member, said rotor element, vanes, and end wall means rotating together and when said axes of said elements are spaced from each other said vanes moving radially along said slots while said chambers increase and decrease in volume during rotation of said rotor to cause a fluid to be pumped in the case of a pump or to cause said rotor to be driven in the case of a motor; first annular duct means for connecting the radially innermost spaces of said slots with each other; and second annular duct means for connecting said radially outermost spaces with each other, so that any fluid located in said spaces can freely move from the spaces decreasing in volume during the to and fro motion of said vanes to the spaces increasing in volume substantially without friction, whereby forces tending to disengage said vanes from said guide ring element are avoided.

10. In a rotary pump or motor, in combination, a center rotor element formed with slot-shaped apertures extending in substantially radial direction; a plurality of vanes slidably arranged in said apertures respectively and having each opposite axial end portion extending in radial and axial direction beyond said rotor element; a guide ring element surrounding said rotor element and guiding said vanes in radial direction, one of said elements being adjustable with respect to the other for adjusting the distance between the axes of said elements; end wall means at said axial end portions of said vanes for axially closing chambers formed between said center rotor element, said vanes and said guide ring element, each of said end wall means being composed of an outer end wall member and an inner end wall member located between said rotor element and said outer end wall member and abutting against said outer end wall member with an end face, only said inner end wall member being formed with slots extending through said inner end wall member in radial direction to the periphery of said inner wall member and in axial direction to said end face thereof for respectively receiving and guiding said vane end portions, whereby said slots may be machined together with said slot-shaped apertures in said center rotor element to exactly the same dimensions, said slots being radially and axially outwardly closed by said outer wall member, said rotor element, vanes, and end wall means rotating together and when said axes of said elements are spaced from each other said vanes moving radially along said slots while said chambers increase and decrease in volume during rotation of said rotor to cause a fluid to be pumped in the case of a pump or to cause said rotor to be driven in the case of a motor, said slots in said inner wall members having spaces at both radial ends thereof alternately enlarged and reduced in volume by the radial to and fro motion of said vanes; duct means for connecting the radially innermost spaces of said slots with the radially outermost spaces thereof; first annular duct means for connecting the radially innermost spaces of said slots with each other; and second annular duct means for connecting said radially outermost spaces with each other, so that any fluid located in said spaces can freely move from the spaces decreasing in volume during the to and fro motion of said vanes to the spaces increasing in volume substantially without friction, whereby forces tending to disengage said vanes from said guide ring element are avoided.

11. In a rotary pump or motor, in combination, a center rotor element formed with slot-shaped apertures extending in substantially radial direction; a plurality of vanes slidably arranged in said apertures respectively and having each opposite axial end portion extending in radial and axial direction beyond said rotor element; a guide ring element surrounding said rotor element and guiding said vanes in radial direction, one of said elements being adjustable with respect to the other for adjusting the distance between the axes of said elements; anti-friction means supporting said guiding ring element for rotation with said rotor element; end wall means at said axial end portions of said vanes for axially closing chambers formed between said center rotor element, said vanes and said guide ring element, each of said end wall means being composed of an outer end wall member and an inner end wall member located between said rotor element and said outer end wall member and abutting against said outer end wall member with an end face, only said inner end wall member being formed with slots extending through said inner end wall member in radial direction to the periphery of said inner wall member and in axial direction to said end face thereof for respectively receiving and guiding said vane end portions, whereby said slots may be machined together with said slot-shaped apertures in said center rotor element to exactly the same dimensions, said slots being radially and axially outwardly closed by said outer wall member, said rotor element, vanes, and end wall means rotating together and when said axes of said elements are spaced from each other said vanes moving radially along said slots while said chambers increase and decrease in volume during rotation of said rotor to cause a fluid to be pumped in the case of a pump or to cause said rotor to be driven in the case of a motor.

12. In a rotary pump or motor, in combination, a center rotor element formed with slot-shaped apertures extending in substantially radial direction; a plurality of vanes slidably arranged in said apertures, respectively, and having each opposite axial end portion extending in radial and axial direction beyond said rotor element; a guide ring element surrounding said rotor element and engaging the outer faces of said vanes between the end portions thereof, said guide ring element being arranged eccentrically with respect to said center rotor element so that during rotation of said elements said vanes are moved in radial direction; and end wall means at said axial end portions of said vanes for axially closing chambers formed between said center rotor element, said vanes and said guide ring element, each of said end wall means being composed of an outer end wall member and an inner wall member located between said rotor element and said outer end wall member and abutting against said outer end wall member with an end face, only said inner end wall member being formed with slots extending through said inner end wall member in radial direction up to the periphery thereof and in axial direction to said end face thereof for respectively receiving and guiding said vane end portions, whereby said slots may be machined together with said slot-shaped apertures in said center rotor element to exactly the same dimensions, said slots being outwardly closed by said outer wall member, said rotor element, vanes and end wall means rotating together so that said vanes will move radially along said slots while said chambers increase and decrease in volume during rotation of said rotor to cause a fluid to be pumped in the case of a pump or to cause said rotor to be driven in the case of a motor.

13. In a rotary pump or motor, in combination, a center rotor element formed with slot-shaped apertures extending in substantially radial direction; a plurality of vanes slidably arranged in said apertures, respectively, and having each opposite axial end portion extending in radial and axial direction beyond said rotor element; a guide ring element surrounding said rotor element and engaging the outer faces of said vanes between the end portions thereof, said guide ring element being arranged eccentrically with respect to said center rotor element so that during rotation of said elements said vanes are moved in radial direction; anti-friction means supporting said guide ring element for rotation with said rotor element; and end wall means at said axial end portions of said vanes for axially closing chambers formed between said center rotor element, said vanes and said guide ring element, each of said end wall means being composed of an outer end wall member and an inner wall member located between said rotor element and said outer end wall member and abutting against said outer end wall member with an end face, only said inner end wall member being formed with slots extending through said inner end wall member in radial direction up to the periphery thereof and in axial direction to said end face thereof for respectively receiving and guiding said vane end portions, whereby said slots may be machined together with said slot-shaped apertures in said center rotor element to exactly the same dimensions, said slots being outwardly closed by said outer wall member, said rotor element, vanes and end wall means rotating together so that said vanes will move radially along said slots while said chambers increase and decrease in volume during rotation of said rotor to cause a fluid to be pumped in the case of a pump or to cause said rotor to be driven in the case of a motor.

14. In a rotary pump or motor, in combination, a center rotor element formed with slot-shaped apertures extending in substantially radial direction; a plurality of vanes slidably arranged in said apertures, respectively, and having each opposite axial end portion extending in radial and axial direction beyond said rotor element; a guide ring element surrounding said rotor element and engaging the outer faces of said vanes between the end portions thereof, said guide ring element being arranged eccentrically with respect to said center rotor element so that during rotation of said elements said vanes are moved in radial direction; end wall means at said axial end portions of said vanes for axially closing chambers formed between said center rotor element, said vanes and said guide ring element, each of said end wall means being formed with slots extending in radial direction for respectively receiving and guiding said vane end portions, said slots being outwardly closed in axial and radial direction by said end wall means, said rotor element, vanes and end wall means rotating together so that said vanes will move radially along said slots while said chambers increase and decrease in volume during rotation of said rotor to cause a fluid to be pumped in the case of a pump or to cause said rotor to be driven in the case of a motor, said slots in said end wall means having spaces at both radial ends thereof alternately enlarged and reduced in volume by the radial to and fro motion of said vanes; and duct means for connecting the radially innermost spaces of said slots with the radially outermost spaces thereof, so that any fluid located in said spaces can freely move from the spaces decreasing in volume during the to and fro motion of said vanes to the spaces increasing in volume substantially without friction, whereby forces tending to disengage the outer faces of said vanes from said guide ring element are avoided.

15. In a rotary pump or motor, in combination, a center rotor element formed with slot-shaped apertures extending in substantially radial direction; a plurality of vanes slidably arranged in said apertures, respectively, and having each opposite axial end portion extending in radial and axial direction beyond said rotor element; a guide ring element surrounding said rotor element and engaging the outer face of said vanes between the end portions thereof, said guide ring element being arranged eccentrically with respect to said center rotor element so that during rotation of said elements said vanes are moved in radial direction; end wall means at said axial end portions of said vanes for axially closing chambers formed between said center rotor element, said vanes and said guide ring element, each of said end wall means being formed with slots extending in radial direction for respectively receiving and guiding said vane end portions, said slots being outwardly closed in axial and radial direction by said end wall means, said rotor element, vanes and end wall means rotating together so that said vanes will move radially along said slots while said chambers increase and decrease in volume during rotation of said rotor to cause a fluid to be pumped in the case of a pump or to cause said rotor to be driven in the case of a motor, said slots in said end wall means having spaces at both radial ends thereof alternately enlarged and reduced in volume by the radial to and fro motion of said vanes; and first annular duct means for connecting the radially innermost spaces of said slots with each other and second annular duct means for connecting said radially outermost spaces with each other, so that any fluid located in said spaces can freely move from the spaces decreasing in volume during the to and fro motion of said vanes to the spaces increasing in volume substantially without friction, whereby forces tending to disengage the outer faces of said vanes from said guide ring element are avoided.

16. In a rotary pump or motor, in combination, a center rotor element formed with slot-shaped apertures extending in substantially radial direction; a plurality of vanes slidably arranged in said apertures, respectively, and having each opposite axial end portion extending in radial and axial direction beyond said rotor element; a guide ring element surrounding said rotor element and engaging the outer faces of said vanes between the end portions thereof, said guide ring element being arranged eccentrically with respect to said center rotor element so that during rotation of said elements said vanes are moved in radial direction; end wall means at said axial end portions of said vanes for axially closing chambers formed between said center rotor element, said vanes and said guide ring element, each of said end wall means being formed with slots extending in radial direction for respectively receiving and guiding said vane end portions, said slots being outwardly closed in axial and radial direction by said end wall means, said rotor element, vanes and end wall means rotating together so that said vanes' will move radially along said slots while said chambers increase and decrease in volume during rotation of said rotor to cause a fluid to be pumped in the case of a pump, said slots in said end wall means having spaces at both radial ends thereof alternately enlarged and reduced in volume by the radial to and fro motion of said vanes; and duct means for connecting the spaces, alternately enlarged and reduced in volume during rotation of the rotor, with each other, so that any fluid located in said spaces can freely move from the spaces decreasing in volume during the to and fro motion of said vanes to the spaces increasing in volume substantially without friction, whereby forces tending to disengage the outer faces of said vanes from said guide ring element are avoided.

17. In a rotary pump or motor, in combination, a center rotor element formed with slot-shaped apertures extending in substantially radial direction; a plurality of vanes slidably arranged in said apertures, respectively, and having each opposite axial end portion extending in radial and axial direction beyond said rotor element, said slot-shaped apertures being wider in circumferential direction than the thickness of said vanes; a guide ring element surrounding said rotor element and engaging the outer faces of said vanes between the end portions thereof, said guide ring element being arranged eccentrically with respect to said center rotor element so that during rotation of said elements said vanes are moved in radial direction; end wall means at said axial end portions of said vanes for axially closing chambers formed between said center rotor element, said vanes and said guide ring element, each of said end wall means being formed with slots extending in radial direction for respectively receiving and guiding said vane end portions, said slots being outwardly closed in axial and radial direction by said end wall means, said rotor element, vanes and end wall means rotating together so that said vanes will move radially along said slots while said chambers increase and decrease in volume during rotation of said rotor to cause a fluid to be pumped in the case of a pump or to cause said rotor to be driven in the case of a motor, said slots in said end wall means having spaces at both radial ends thereof alternately enlarged and reduced in volume by the radial to and fro motion of said vanes; and duct means for connecting the radially innermost spaces of said slots with the radially outermost spaces thereof, so that any fluid located in said spaces can freely move from the spaces decreasing in volume during the to and fro motion of said vanes to the spaces increasing in volume substantially without friction, whereby forces tending to disengage the outer faces of said vanes from said guide ring element are avoided.

18. In a rotary pump or motor, in combination, a center rotor formed with a plurality of slot-shaped apertures extending respectively in substantially radial direction through the whole length of said center rotor; a plurality of vane means slidably arranged in said apertures, respectively, and having each opposite axial end portion extending in radial and axial direction beyond said center rotor; a guide ring surrounding said center rotor and engaging the outer faces of said vane means between the end portions thereof, said guide ring being arranged eccentrically with respect to said center rotor so that during rotation of said center rotor said vane means are moved in radial direction; and wall means at said end portions of said vane means for axially closing chambers formed between said center rotor, said vane means and said guide ring, said end wall means being formed with grooves for respectively receiving and guiding said vane end portions, said grooves extending in radial direction beyond said vane end portions and being closed at the outer ends thereof so as to define with said vane end portions spaces which are alternately enlarged and reduced in volume during the radial to and fro movement of said vane means, said center rotor, vane means and end wall means rotating together so that said vane means will move radially along said slot-shaped apertures while said chambers increase and decrease in volume during rotation of said rotor to cause a fluid to be pumped in the case of a pump or to cause said rotor to be driven in the case of a motor; and duct means connecting the radially outermost spaces of said slots with each other so that any fluid located in said spaces can freely move from the spaces decreasing in volume to the spaces increasing in volume during the to and fro movement of said vane end portions substantially without friction, whereby forces tending to disengage the outer faces of said vane means from said guide rings are avoided.

19. In a rotary pump or motor as defined in claim 18, in which each of said vane means includes an elongated blade formed at the outer face thereof with an elongated recess of cylindrical configuration, a slide element of segment-shaped cross-section turnably supported in said recess and contacting said guide ring, and means on said blade for preventing movement of said slide element in radial direction relative to said blade.

References Cited in the file of this patent

UNITED STATES PATENTS

| | | |
|---|---|---|
| 1,943,929 | Rayburn | Jan. 16, 1934 |
| 1,988,213 | Ott | Jan. 15, 1935 |
| 2,149,143 | Landenberger | Feb. 28, 1939 |
| 2,278,131 | Livermore | Mar. 31, 1942 |
| 2,348,428 | Tucker | May 9, 1944 |
| 2,362,420 | Tucker et al. | Nov. 7, 1944 |
| 2,371,081 | Tucker et al. | Mar. 6, 1945 |
| 2,469,097 | Wrenn | May 3, 1949 |
| 2,499,763 | Livermore | Mar. 7, 1950 |
| 2,543,603 | Schatzel | Feb. 27, 1951 |
| 2,589,449 | Stageberg | Mar. 18, 1952 |
| 2,590,729 | Scognamillo | Mar. 25, 1952 |
| 2,612,114 | Ernst | Sept. 30, 1952 |
| 2,653,548 | Bodensieck | Sept. 29, 1953 |
| 2,658,456 | Wahlmark | Nov. 10, 1953 |
| 2,680,348 | Wahlmark | June 8, 1954 |
| 2,684,037 | Scognamillo | July 20, 1954 |
| 2,750,895 | Sturm | June 19, 1956 |